Feb. 2, 1965 F. S. ALLINQUANT 3,168,169
AIR BLEEDING DEVICE FOR SHOCK ABSORBERS MOUNTED
IN A SUBSTANTIALLY HORIZONTAL POSITION
Filed April 30, 1963
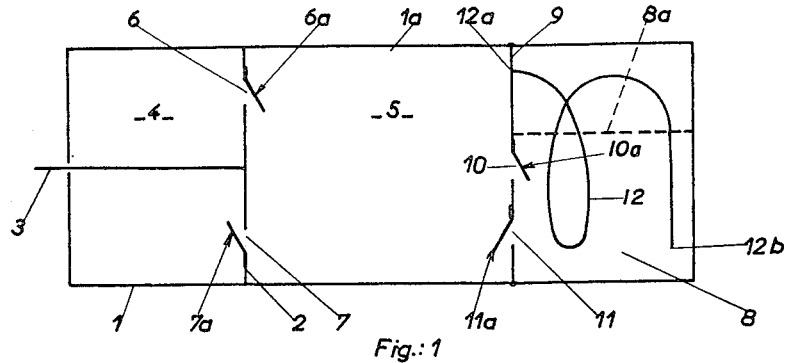
Fig.: 1
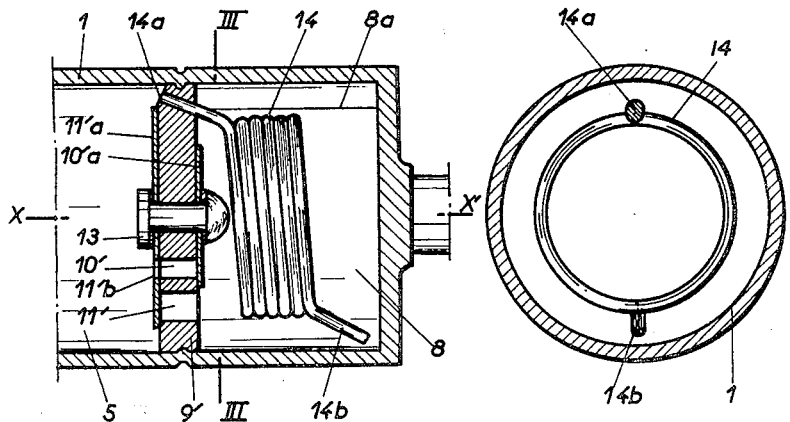
Fig.: 2
Fig.: 3
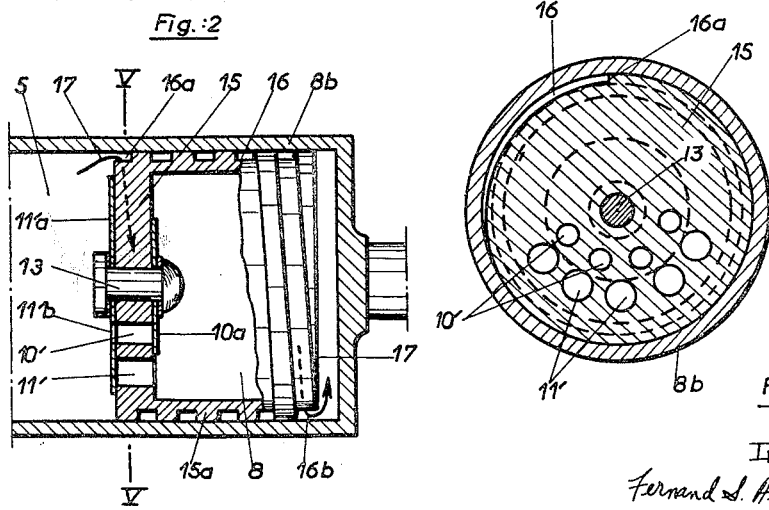
Fig.: 4
Fig.: 5
INVENTOR
Fernand S. Allinquant
By Watson, Cole, Grindle & Watson
ATTORNEYS

United States Patent Office 3,168,169
Patented Feb. 2, 1965

3,168,169
AIR BLEEDING DEVICE FOR SHOCK ABSORBERS MOUNTED IN A SUBSTANTIALLY HORIZONTAL POSITION
Fernand Stanislas Allinquant, 53 Avenue le Notre, Sceaux, Seine, France
Filed Apr. 30, 1963, Ser. No. 276,852
Claims priority, application France, May 11, 1962, 897,276
3 Claims. (Cl. 188—100)

The invention relates to hydraulic shock absorbers of the type comprising a piston provided with a system of valves and sliding in a cylinder, one chamber of which communicates by way of another system of valves with a compensating reservoir which compensates for the variations in the space occupied in the cylinder by the piston rod, the said reservoir containing liquid and air at one and the same time. This invention has for its object the provision of a device which will effect the bleeding of air from the cylinder, that is to say, which will effect the return to the compensating reservoir of air which has penetrated into the cylinder when the shock absorber is mounted in a position approaching the horizontal.

In shock absorbers of the above-mentioned type, the compensating reservoir is generally arranged as an extension of the cylinder and the latter is mounted vertically. If air penetrates into the cylinder, it returns naturally to the reservoir by way of the system of valves providing communication between the latter and the said cylinder. If, on the other hand, the shock absorber is mounted horizontally or is considerably inclined with respect to the vertical, air penetrating into the cylinder can no longer return to the reservoir by way of the system of valves and irregular operation of the shock absorber results.

According to the invention there is provided an air bleeding device for application to a horizontal shock absorber, which device is constituted by a duct of small cross-section and considerable length debouching at one end in the upper zone of the cylinder and at the other end in the lower portion of the compensating reservoir, the said duct being preferably wound in a helix around a horizontal or substantially horizontal axis.

The description which follows is given with reference to the acompanying drawings and by way of non-limitative example only and will make clearly understood, the manner in which the invention can be carried into effect, the details appearing both from the drawings and from the text forming, of course, part of the said invention.

In the drawings:

FIGURE 1 shows in diagrammatic axial section, a horizontally mounted shock absorber provided with a bleeding device according to the invention;

FIGURE 2 shows one practical embodiment of the device of the invention, the device being seen in elevation and being shown mounted in a shock absorber which is shown in section;

FIGURE 3 is a cross-sectional view on the line III—III of FIGURE 2;

FIGURE 4 shows another practical form of device which is shown partly in section and partly in elevation, located in a cylinder which is illustrated in section, and FIGURE 5 is a cross-sectional view on the line V—V of FIGURE 4.

Referring particularly to FIGURE 1, the shock absorber shown therein is constituted by a cylinder 1 in which there slides a piston 2 carried by a piston-rod 3, the piston 2 defining in the cylinder 1 a first chamber 4, through which the rod 3 extends, and a second chamber 5. In the body of the piston 2 there are formed two systems of passages which are shown diagrammatically at 6 and 7, and are closed by valves shown at 6a and 7a respectively, working in opposite directions. Arranged as an extension of the cylinder 1, there is a compensating chamber 8 which is separated from the chamber 5 by a fixed partition 9 and is provided with a system of passages 10 and 11 and valves 10a and 11a similar to the passages 6 and 7 and valves 6a and 7a of the piston.

Shock absorbers of the type described above are well known and it is unnecessary to describe the operation thereof in detail.

The cylinder 1 and a part of the compensating reservoir 8 are filled with oil. When the piston 2 slides in the cylinder 1, oil passes from the chamber 4 to the chamber 5 or vice versa, being subjected to a checking action by the system of passages and valves 6, 7, 6a, 7a. At the same time, a certain quantity of oil, corresponding to the variation in the space or volume occupied in the chamber 4 by the rod 3, passes from the chamber 5 into the reservoir 8 or vice versa, being subjected to a checking action by the system of passages and valves 10, 11, 10a, 11a.

When the shock absorber is mounted vertically or at a small inclination with respect to the vertical, with the compensating reservoir 8 disposed above the chamber 5, any air which has succeeded in penetrating into the cylinder 1 collects in the upper portion of the chamber 5 and is evacuated naturally into the reservoir 8 through the passages 10 when, during the operation of the shock absorber, the valves 10a and 11a are opened.

This is not the case when the axis of the cylinder 1 is very substantially inclined with respect to the vertical, for example when the shock absorber is mounted horizontally, as in FIGURE 1, so that its axis is perpendicular to the vertical. In this case, the surface of separation between the oil and the air in the reservoir 8 is located at, for example, a level such as is indicated by the dotted line 8a in FIGURE 1 and air which has entered the cylinder 1 has a tendency to collect in the upper zone 1a and can no longer return to the compensating reservoir 8.

The section and length of the duct 12 could be calculated by disregarding the valve 10a which opens only for very sudden movements of the piston 2 and satisfying the following conditions:

(1) In the movement of the piston 2 toward the compensation chamber 8, the loss of head across the partition 9 which accompanies the delivery by the conduit 12 of a flow corresponding to the volume of the rod 3 must be greater than the loss of head across the channels 7 of the piston;

(2) In the reverse movement of the piston, the flow through the duct 12 must remain negligible as compared with the flow of oil through the valve 11a which opens, as is known, under very slight pressure difference.

In practice, in a shock absorber for a motor vehicle of small power it has been found to be satisfactory for the duct 12 to be constituted by a tube having an internal diameter of 1.5 mm. and a length of 400 mm., but this example is given only so as to give some idea of the dimensions and is not of a restrictive nature.

A tube calculated in this manner behaves in practice as a single-direction duct. As a matter of fact, it is always passed through in the same direction. This asymmetry in operation is accentuated, naturally, when the oil contained in the shock absorber tends to become emulsified. As a matter of fact the oil located at the top of cylinder 1a, where the end 12a of the duct debouches is then more charged with gas bubbles and therefore less viscous than the oil located at the bottom of the compensation chamber 8 where the end 12b of the duct debouches.

The duct 12 is advantageously wound in a helix around the axis X—X'.

FIGURES 2 and 3 show one practical embodiment of bleeding device in accordance with the invention. The compensating reservoir 8 is separated from the chamber 5 of the cylinder 1 by a partition 9' in which are formed sets of passages 10' and 11', only one passage of each set being visible in the drawings. A rivet 13 holds a pre-stressed foil 10'a applied against that surface of the partition 9' at which the passages 10' open into the reservoir 8 and also holds applied against the surface of the partition 9, a second foil 11'a which is much less rigid than the foil 10'a and has orifices 11'b in positions corresponding to the positions of the passages 10'. These means perform the function corresponding to the function of the passages 10, 11 and the valves 10a, 11a of FIGURE 1.

The bleeding device provided by the invention is constituted by a tube 14 wound in a helix around the axis X—X', the tube being disposed in the compensating reservoir 8 and having one end portion 14a fixed, for example, by brazing or riveting, in the partition 9' so as to open into the upper portion of the chamber 5, while its other end 14b opens at the lower portion of the reservoir 8.

In the practical embodiment shown in FIGURES 4 and 5, the partition 15 is provided with a system of passages and foils forming valve means similar to that described with reference to FIGURES 2 and 3. The partition 15 is made integral with a hollow cylinder 15a which fits against the cylindrical wall 8b of the reservoir 8 without any clearance, apart from a helical groove 16 formed in the surface of the cylinder 15a which constitutes the bleeding device. The ends 16a of the groove opens at the upper portion of the chamber 5, while the end 16b opens at the lower portion of the reservoir 8. The arrows 17 show diagrammatically the path of the air entering the groove 16 from the chamber 5 and issuing from the groove into the reservoir 8.

What I claim is:

1. In a hydraulic shock absorber which comprises a cylinder arranged with its axis greatly inclined with respect to the vertical, a piston, a piston-rod, an auxiliary chamber communicating with the cylinder to compensate for variation, which occurs during relative movement of the piston and cylinder, in the volume occupied in the cylinder by the piston rod and valve means controlling communication between the auxiliary chamber and the cylinder, an air bleeding device which comprises a duct of small cross-sectional area and of considerable length having one end thereof opening at a relatively high position of the cylinder and the other end thereof opening at a relatively low position of the said chamber, the dimensions of the duct being such that the loss of pressure therein is greater than the loss of pressure which occurs when the valve means are traversed in the two possible directions of displacement of the piston.

2. In a hydraulic shock absorber which comprises a cylinder arranged with its axis greatly inclined with respect to the vertical, a piston, a piston-rod, an auxiliary chamber communicating with the cylinder to compensate for variation, which occurs during relative movement of the piston and cylinder, in the volume occupied in the cylinder by the piston rod and valve means controlling communication between the auxiliary chamber and the cylinder, an air bleeding device which comprises a duct of small cross-sectional area and of considerable length having one end thereof opening at a relatively high position of the cylinder and the other end thereof opening at a relatively low position of the said chamber, the duct being provided by a small-diameter tube, the said one end of the duct opening into the cylinder through a partition which separates the cylinder from the auxiliary chamber.

3. In a hydraulic shock absorber which comprises a cylinder arranged with its axis greatly inclined with respect to the vertical, a piston, a piston-rod, an auxiliary chamber communicating with the cylinder to compensate for variation, which occurs during relative movement of the piston and cylinder, in the volume occupied in the cylinder by the piston rod and valve means controlling communication between the auxiliary chamber and the cylinder, an air bleeding device which comprises a duct of small cross-sectional area and of considerable length having one end thereof opening at a relatively high position of the cylinder and the other end thereof opening at a relatively low position of the said chamber, including a partition within said cylinder separating said auxiliary chamber from the rest of the cylinder, said partition including a cylindrical skirt received without clearance within the cylinder and formed with a helical groove to provide the said duct.

References Cited by the Examiner
UNITED STATES PATENTS 1,855,064  4/32  Messier _____ 267—64
3,070,191  12/62  Allinquant _____ 188—100

EUGENE G. BOTZ, *Primary Examiner.*
ARTHUR L. LA POINT, *Examiner.*